United States Patent [19]

Craw et al.

[11] Patent Number: 5,151,402

[45] Date of Patent: Sep. 29, 1992

[54] SILYLATION OF CHARCOAL TO INCREASE ITS HYDROPHOBICITY

[75] Inventors: Marjory T. Craw, Chalk River; Kevin D. McCrimmon, Deep River; Lyse L. Deschenes, Chalk River, all of Canada

[73] Assignee: Atomic Energy of Canada Limited, Ottawa, Canada

[21] Appl. No.: 619,242

[22] Filed: Nov. 28, 1990

[51] Int. Cl.$^5$ .................. B01J 20/22; B01J 20/32
[52] U.S. Cl. ..................... 502/401; 502/413
[58] Field of Search ............. 502/413, 401, 407, 158

[56] References Cited

U.S. PATENT DOCUMENTS

| | | |
|---|---|---|
| 2,697,029 | 12/1954 | Baker et al. ............ 502/413 |
| 4,561,976 | 12/1985 | Houser ................. 210/663 |

FOREIGN PATENT DOCUMENTS

| | | | |
|---|---|---|---|
| 1237116 | 5/1988 | Canada ............ 252/29 |
| 74-018556 | 5/1974 | Japan . | |
| 47271 | 5/1974 | Japan ............ 502/401 |
| 53-062395 | 6/1978 | Japan . | |
| 55-044369 | 3/1980 | Japan . | |
| 55-073263 | 6/1980 | Japan . | |
| 61-118402 | 6/1986 | Japan . | |
| 727203 | 4/1980 | U.S.S.R. ............ 502/413 |
| 732207 | 8/1980 | U.S.S.R. . | |
| 905192 | 2/1982 | U.S.S.R. . | |

OTHER PUBLICATIONS

G. Wojcik and K. Karpinski, Chemia Stosowana, XXII, 2, (1978).

A. D. Belapurkar et al., Applied Catalysis, 43, p. 1-13 (1988).

*Primary Examiner*—Carl F. Dees
*Attorney, Agent, or Firm*—Merchant, Gould, Smith, Edell, Welter & Schmidt

[57] ABSTRACT

When charcoal is used as an adsorbent, its effective lifetime is decreased by the adsorption of water vapor. A process is described whereby the charcoal is treated with an effective amount of a non-chlorinated organosilane to increase the hydrophobicity of the charcoal. The reduction in surface area and organic adsorption capacity, which occurs upon silylation, is relatively small whereas there is a somewhat greater reduction in water adsorption capacity of the silylated charcoal.

27 Claims, No Drawings

SILYLATION OF CHARCOAL TO INCREASE ITS HYDROPHOBICITY

This invention relates to the silylation of charcoal to increase its hydrophobicity. More specifically this invention relates to the chemical modification of charcoal with non-chlorinated organo-silanes to increase its hydrophobicity. Furthermore, this invention relates to the silylated charcoal thus produced and the use thereof.

BACKGROUND AND PRIOR ART

Adsorbent carbon, particularly activated carbon, is used extensively for a variety of purposes many of which depend to a considerable extent on the large surface area and surface activity of the carbon particles. Carbon therefore is used in many filter applications. For example, carbon filters are used in water filtration systems to remove dangerous organic compounds that are present in drinking water, as disclosed in U.S. Pat. No. 4,561,976.

Wojcik and Karpinski described, in Chemia Stosowana XII, 2, 351 (1978) a process of modifying carbons by treating activated carbon with trimethylchlorosilane and dimethylsulfoxide. The modified carbon displayed lower adsorption properties for water and ethanol vapour. The reduction of adsorption properties with respect to water vapour was larger than with respect to ethanol.

In the present invention, chlorinated silanes are avoided. If chlorinated silanes are used hydrogen chloride (HCl) will be produced during the silylating process. It is thus possible that the silylated carbon produced also contains trapped HCl, that may then leach out of the treated charcoal and cause problems such as corrosion.

SUMMARY OF INVENTION

According to the present invention there is provided a process for chemically modifying charcoal to reduce water vapour adsorption capacity by exposing the charcoal to a non-chlorinated organo-silane for sufficient time and at a sufficient temperature to coat the charcoal with silane to reduce the surface area of the charcoal by at most 50 percent. In a further embodiment of the present invention, the charcoal can be humidified by contacting the charcoal with water vapour for sufficient time to produce a treated charcoal with up to 10 weight percent water vapour. After humidification, the charcoal is silylated as described above.

Further, according to the present invention there is provided a silylated charcoal, that has a reduced adsorption capacity to water vapour. This silylated charcoal has a surface area ranging from about 500 to about 800 m$^2$/g.

DETAILED DESCRIPTION

The present invention is directed towards a process for silylating charcoal to reduce the water vapour adsorption by the charcoal. The process involves treating the charcoal with a non-chlorinated organo-silane to reduce the surface area of the charcoal. Alternatively the charcoal is first humidified to yield a charcoal with up to 10 weight percent of water vapour. The humidified charcoal is then silylated with a non-chlorinated organo-silane, as described above.

After its water adsorption capacity is reduced, the treated carbon does not become saturated with water and therefore can selectively adsorb more organic materials. By the process of the present invention, the life span of the charcoal filter is increased. Also there is an overall reduction in the amount of charcoal used to achieve a desired result.

The charcoal used according to the present invention is preferably a vegetable based charcoal. Most preferably the charcoal is a coconut-based charcoal. The charcoal granule size used according to the present invention is preferably from 4 to 10 mesh.

In one embodiment of the present invention, the first step in the process is to humidify the charcoal up to about 10 weight percent. The humidification step then causes the silane to dimerize or trimerize. If the degree of humidification is extensive, for example, above 10 weight percent, then the silane polymerizes to an extent where precipitation occurs. The precipitate is interspersed with the charcoal granules. Therefore humidification above 10 weight percent is not recommended. It has been found that it is preferred to humidify the charcoal from about 2.5 weight percent to about 5 weight percent, based on the weight of the charcoal.

The water is introduced as water vapour carried in an inert gas which is passed over the carbon bed. For example, water vapour is contacted with the carbon by a helium/water vapour or air/water vapour mixture. The water vapour can be passed over the carbon bed from about 30 minutes to about 180 minutes. For convenience room temperature (from about 20° C. to about 30° C.) is used for the humidification of the charcoal.

The hydrated charcoal or unhydrated charcoal is treated with a non-chlorinated organo-silane. The non-chlorinated organo-silanes that can be used according to the present invention include, for example, alkoxy silanes. Examples of alkoxy silanes that can be used according to the present invention include: methyldimethoxy silane, methyldiethoxy silane, dimethylmethoxy silane, methyltrimethoxy silane and trimethylmethoxy silane. The amount of silane used in the reaction is within the range of about 10% to about 20%.

Silylation of the charcoal can be accomplished by a number of methods known in the art. For example the carbon may be silylated by vapour phase silylation.

Silylation of the charcoal can also be accomplished by a reflux reaction. The carbon in an organic solvent is refluxed with the silane in solution for about 1 hour to about 5 hours. The temperature of the reaction depends upon the organic solvent used. The organic solvents that can be used in the present process are, for example, benzene, xylene, or toluene. The temperature of the reaction is approximately equal to the boiling point of the solvent used in the reflux reaction. For example, with the solvents: benzene, toluene and xylene, the reaction temperature is about 80° C., 110° C. and 140° C., respectively.

Following reflux the organic solvent and unreacted silane are removed by methods known in the art; for example distillation, evaporation, evacuation under vacuum or decanting off the excess solvent followed by evacuation are acceptable. Following removal of the organic solvent the silylated carbon is dried.

Silylation results in a reduction of the surface area of the charcoal. The loss of surface area and organic adsorption capacity, which occurs on silylation, is relatively small; however, there is a significantly greater reduction in the water adsorption capacity of the silylated charcoal. The more silane that is added to the charcoal the more hydrophobic the charcoal will become. However, as more silane material is added, more pores of the charcoal may be blocked and, therefore, there will be a proportional reduction in the surface area. As the surface area of the charcoal is reduced so will be the organic adsorption capacity of the charcoal. Therefore, a balance must be established between the amount of silylation and the reduction in surface area. Therefore, it is preferred to silylate the charcoal so that the surface area is reduced by about 10 to about 50 percent. Therefore, the surface area of the treated charcoal will be from about 800 to about 500 m$^2$/g.

The following examples set forth various embodiments of the invention but are not to be construed as limiting.

EXAMPLE 1: Sil 24

A coconut based charcoal (Haycarb YAO available from Carbon and Filtration Products Company, Islington, Ontario), (104.6039 g) was placed in a saturation vessel, with a capacity of 500 mL, and water saturated air was passed over the carbon at a flow rate of 100 mL/min for a period of 2 hours. The weight of the carbon after water saturation was 109.6039 g.

An aliquot of the above humidified carbon (50.0114 g) was placed in a 1 L round bottom flask to which 100 mL of toluene was added with 11.7560 g of redistilled methyltrimethoxy silane (MTMS). The mixture was refluxed for about 2 hours at 110° C. The carbon was left sitting in solution over night. Residual toluene and unreacted silane was distilled from the carbon. Any remaining toluene was evaporated off using a rotary evaporator. The sample was heated in a vacuum oven at 130° C. for 3.5 hours to dry. The final weight of the carbon was 60.4601 g.

The surface area of the treated carbon was determined from nitrogen absorption isotherm at approximately 80K (BET), as is known in the art. The surface area and the percent surface area reduction of the treated carbon are found in Table 1.

TABLE 1

Surface Area and Water Adsorption Data of Silylated Haycarb Carbon

| Sample | Pretreatment (humidified) Wt. % | Silylation Description | Surface $^2$ Area m/g | Surface Area Reduction % |
|---|---|---|---|---|
| Haycarb | | | 917.96 | |
| Sil 24 | 5.0 | 20% MTMS/T refluxed | 542.98 | 40 |
| Sil 25 | 5.0 | 20% MTMS/X refluxed | 515.66 | 43 |
| Sil 27 | 3.0 | 10% MTMS/T refluxed | 662.04 | 27 |
| Sil 35 | 2.5 | 10% MDMS/T refluxed | 745.98 | 18 |
| Sil 36 | 2.5 | 20% MDMS/T refluxed | 609.25 | 33 |
| Sil 37 | 3.0 | 10% TMMS/T refluxed | 674.11 | 26 |
| Sil 38 | 3.0 | 20% TMMS/T refluxed | 798.81 | 13 |
| Sil 39 | 2.5 | 20% MTMS/T refluxed | 747.21 | 19 |
| Sil 04 | * | 20% MTMS/B refluxed | 690.45 | 25 |

X = Xylene
B = Benzene
T = Toluene
* = no prehumidification

EXAMPLE 2: Sil 04

In this Example the Haycarb YAO carbon was silylated without the pre-humidification step. In this process 100 mL of benzene plus 10.01 g of redistilled methyltrimethoxy silane and 50.03 g of Haycarb YAO were mixed in a 1 L flask and refluxed at 80° C. Refluxing continued for 2 hours at which time the reactants were allowed to stand overnight. The mixture was refluxed for a additional 2 hours prior to the removal of the residual solvent and unreacted silane, as described above.

The carbon sample was rotary evaporated to dryness and then placed in a vacuum oven at 80° C. under vacuum overnight. Following drying the carbon had a weight of 58.90 g. The surface area of this sample was determined as described above.

Water adsorption and hexane adsorption capacities of the treated carbon were determined by ascertaining the weight of the sample when saturated with water or hexane, using a Cahn Balance. Table 2 compares the water and hexane adsorption properties of the treated charcoal. By way of comparison the water adsorption and hexane adsorption capacities of the untreated carbon (Haycarb YAO) are also shown in Table 2.

TABLE 2

Water and Hexane Adsorption Data of the Silylated Carbon Samples

| Sample | RH % | Water Adsorption mg/g | % Reduction Water Adsorption | Hexane Adsorption mg/g | % Reduction Hexane Adsorption |
|---|---|---|---|---|---|
| Haycarb | 93.9 | 463.58 | — | 275.88 | — |
| Sil 27 | 94.5 | 380.45 | 18 | 283.28 | 0 |
| Sil 04 | 90.00 | 232.20 | 50 | 243.62 | 12 |

EXAMPLE 3: Sil 25

A second aliquot (50.0110 g) of humidified carbon prepared in Example 1 was refluxed with 100 mL of xylene and 10.7895 g of MTMS (redistilled) for 2 hours at 140° C. The Haycarb YAO carbon was allowed to settle in solution overnight. Residual xylene and unreacted silane were removed by distillation, as described above. Remaining xylene was removed by heating the carbon in a vacuum oven as described in Example 1. The final weight of the silylated carbon was 65.2246 g. Analysis of the surface area was done as described in Example 1. The results of these analyses are also found in Table 1.

EXAMPLE 4: Sil 27

Haycarb YAO carbon (51.1509 g) was placed in a saturation vessel, where water saturated air was passed over the carbon, as described in Example 1, for a period of 30 min. The carbon was reweighed and found to weigh 52.9216 g. Toluene (100 mL) and redistilled MTMS (5.3033 g) was poured over the carbon in a 1 L round bottom flask. The mixture was then refluxed for 2 hours at 110° C. Residual toluene and unreacted silane were removed by distillation as described in Example 1. Remaining toluene was removed from the carbon using a rotary evaporator. The carbon was dried in a vacuum oven overnight at 120 C. The final weight of the silylated carbon was 62.7045 g. The surface area of the treated carbon determined as described in Example 1. Results of these analyses are found in Table 1.

EXAMPLE 5: Sil 35

Haycarb (100.170 g) was placed in a saturation vessel. Air saturated with water was passed over the carbon for approximately 30 minutes. The weight of the carbon following this humidification step was 102.7560 g. The humidified carbon (50.3353 g) was placed in the bottom of a 1 L round bottom flask with 100 mL of toluene and 5.1391 g of MDMS (10.21%). The carbon was refluxed for two hours at 110° C. Residual toluene and unreacted silane was removed by distillation, as described above. Remaining solvent was removed by evaporation in a rotary evaporator. The carbon sample was then dried in a vacuum oven overnight. The weight of the treated carbon was 56.6295 g. The surface area of the treated carbon was determined as described in Example 1.

EXAMPLE 6: Sil 36

The humidified Haycarb (50.0370 g of the humidified sample prepared in Example 5) was refluxed with 100 mL of toluene and 10.5870 g of MDMS (21. 16%) for 2 hours at 110° C. Residual toluene and unreacted silane was removed as described in Example 1. Remaining toluene was evaporated from the carbon using a rotary evaporator. The treated carbon sample, following drying in a vacuum oven for several hours, had a final weight of 60.6258 g. The results of the surface area determination are shown in Table 1.

EXAMPLE 7: Sil 37

Dried Haycarb (10.0055 g) was placed in a saturation vessel. Water saturated air flowed over the carbon for about 10 minutes. The humidified carbon had a weight of 10.3091 g. A sample of this humidified carbon (2.0198 g) was refluxed with 10 mL of toluene and 0.2219 g of TMMS for 2 hours at 110° C. Following the removal of the residual toluene and unreacted silane, as described above, the weight of the dried, treated carbon was 2.2005 g. The results of the surface area determination are shown in Table 1.

EXAMPLE 8: Sil 38

The humidified Haycarb (2.0198 g of the humidified sample prepared in Example 7) was refluxed with 10 mL of toluene and 0.4086 g of TMMS for 2 hours at 110° C. Residual toluene and unreacted silane were removed as described in Example 1. Remaining toluene was evaporated from the carbon using a rotary evaporator. The treated carbon sample, following drying in a vacuum oven for several hours, had a final weight of 2.2199 g. The results of the surface area determination are shown in Table 1.

EXAMPLE 9: Sil 39

Haycarb (50.0405 g) was placed in a saturation vessel. Air saturated with water was passed over the carbon for approximately 10 minutes. The weight of the carbon following this humidification step was 51.3285 g. The humidified carbon was placed in the bottom of a 1 L round bottom flask with 100 mL of toluene and 10.4465 g of MTMS. The carbon was refluxed for two hours at 110° C. Residual toluene and unreacted silane were removed by distillation, as described above. Remaining solvent was removed by evaporation in a rotary evaporator. The carbon sample was then dried in a vacuum oven overnight. The weight of the treated carbon was 57.2144 g. The surface area of the treated carbon was determine as described in Example 1.

It is understood that the invention has been disclosed herein in connection with certain examples and embodiments. However such changes, modifications or equivalents as can be used by those skilled in the art are intended to be included. Accordingly, the disclosure is to be construed as exemplary, rather than limiting, and such changes within the principles of the invention as are obvious to one skilled in the art are intended to be included within the scope of the claims.

The embodiments of the invention in which an exclusive property or privilege is claimed are defined as follows:

1. A process for chemically modifying charcoal to increase its hydrophobicity by exposing the charcoal to a non-chlorinated organo-silane for sufficient time and at a sufficient temperature to coat the charcoal with silane to yield a surface area reduction of the charcoal of not more than 50 percent.

2. The process of claim 1 wherein the charcoal is selected from the group consisting of vegetable-based charcoals.

3. The process of claim 2 wherein the vegetable-based charcoal is a coconut-based charcoal.

4. The process of claim 1 wherein the charcoal has a granule size from about 4 to about 10 mesh.

5. The process of claim 1 wherein the non-chlorinated organo-silane is an alkoxy-silane.

6. The process of claim 5 wherein the alkoxy silane is selected from the group consisting of methyldimethoxy silane, methyldiethoxy silane, dimethylmethoxy silane, methyltrimethoxy silane and trimethylmethoxy silane.

7. The process of claim 1 wherein the charcoal is exposed to the non-chlorinated organo-silane by refluxing in the presence of an organic solvent from about 1 to about 5 hours.

8. The process of claim 7 further comprising the steps of:
   c) removing the organic solvent and unreacted silane by distillation and
   drying the silylated charcoal.

9. The process of claim 7 wherein the organic solvent is selected from the group consisting of benzene, xylene and toluene.

10. The process of claim 1, further comprising the step of humidifying the charcoal, prior to silylation, by contacting the charcoal with water vapour for a sufficient time to produce a charcoal containing up to 10 weight percent water vapour.

11. The process of claim 10 wherein the charcoal is humidified from about 2.5 weight percent to about 5 weight percent.

12. The process of claim 10 wherein the charcoal is selected from the group consisting of vegetable-based charcoals.

13. The process of claim 12 wherein the vegetable-based charcoal is a coconut-based charcoal.

14. The process of claim 13 wherein the charcoal has a granule size from about 4 to about 10 mesh.

15. The process of claim 10 wherein the non-chlorinated organo-silane is an alkoxy silane.

16. The process of claim 10 wherein the alkoxy silane is selected from the group consisting of methyldimethoxy silane, methyldiethoxy silane, dimethylmethoxy silane, methyltrimethoxy silane and trimethylmethoxy silane.

17. The process of claim 10 wherein the charcoal is exposed to the non-chlorinated organo-silane by refluxing in the presence of an organic solvent from about 1 to about 5 hours.

18. The process of claim 17 further comprising the steps of:
   c) removing the organic solvent and unreacted silane by distillation and
   d) drying the silylated charcoal.

19. The process of claim 17 wherein the organic solvent is selected from the group consisting of benzene, xylene and toluene.

20. The process of claim 10 wherein the water vapour is contacted with the charcoal from about 30 minutes to about 180 minutes.

21. The process of claim 20 wherein the water vapour is contacted with the charcoal by a helium/water vapour or air/water vapour mixture.

22. Silylated vegetable-based charcoal wherein the charcoal has been silylated with a non-chlorinated organosilane to yield a silylated charcoal with a surface area from about 500 $m^2/g$ to about 800 $m^2/g$.

23. The charcoal of claim 22 wherein the vegetable-based charcoal is a coconut-based charcoal.

24. The charcoal of claim 22 wherein the charcoal is humidified from about 2.5 weight percent to about 5 weight percent prior to silylation.

25. The charcoal of claim 22 wherein the charcoal has a granule size from about 4 to about 10 mesh.

26. The charcoal of claim 22 wherein the non-chlorinated organo-silane is an alkoxy silane.

27. The charcoal of claim 22 wherein the non-chlorinated alkoxy silanes are selected from the group consisting of methyldimethoxy silane, methyldiethoxy silane, dimethylmethoxy silane, methyltrimethoxy silane and trimethylmethoxy silane.

* * * * *